United States Patent
Ibanez

(10) Patent No.: US 10,005,918 B2
(45) Date of Patent: *Jun. 26, 2018

(54) PRIMER COATING FOR METALLIZED GAS BARRIER FILMS

(71) Applicant: Michelman, Inc., Cincinnati, OH (US)

(72) Inventor: Michelle Ibanez, Cincinnati, OH (US)

(73) Assignee: Michelman, Inc., Cincinnati, OH (US)

( * ) Notice: Subject to any disclaimer, the term of this patent is extended or adjusted under 35 U.S.C. 154(b) by 217 days.

This patent is subject to a terminal disclaimer.

(21) Appl. No.: 14/982,723

(22) Filed: Dec. 29, 2015

(65) Prior Publication Data

US 2016/0130459 A1    May 12, 2016

Related U.S. Application Data

(63) Continuation of application No. 14/070,115, filed on Nov. 1, 2013, now Pat. No. 9,303,179.

(60) Provisional application No. 61/721,834, filed on Nov. 2, 2012.

(51) Int. Cl.

| B32B 7/12 | (2006.01) |
|---|---|
| C09D 5/28 | (2006.01) |
| C08J 7/04 | (2006.01) |
| C09D 129/04 | (2006.01) |
| C09D 5/00 | (2006.01) |
| B32B 15/082 | (2006.01) |
| C09D 175/04 | (2006.01) |

(52) U.S. Cl.
CPC ............ *C09D 129/04* (2013.01); *B32B 7/12* (2013.01); *B32B 15/082* (2013.01); *C08J 7/045* (2013.01); *C09D 5/002* (2013.01); *C09D 5/28* (2013.01); *C09D 175/04* (2013.01); *C08J 2323/12* (2013.01); *C08J 2367/02* (2013.01); *C08J 2367/04* (2013.01); *C08J 2377/00* (2013.01); *C08J 2429/04* (2013.01); *Y10T 428/265* (2015.01); *Y10T 428/31605* (2015.04); *Y10T 428/31699* (2015.04)

(58) Field of Classification Search
None
See application file for complete search history.

(56) References Cited

U.S. PATENT DOCUMENTS

| 3,249,572 A | 5/1966 | Irwin et al. |
| 5,547,764 A | 8/1996 | Blais et al. |
| 6,106,950 A * | 8/2000 | Searle ............... B32B 27/08 |
| | | 427/372.2 |
| 7,005,169 B2 | 2/2006 | Klein et al. |
| 2009/0022981 A1 | 1/2009 | Yoshida et al. |
| 2011/0236703 A1 | 9/2011 | Mcgee |
| 2012/0028058 A1 | 2/2012 | Paolilli et al. |
| 2012/0088108 A1 * | 4/2012 | Paolilli ............... C08J 7/042 |
| | | 428/457 |

FOREIGN PATENT DOCUMENTS

| BE | 699763 A | 12/1967 |
| CN | 100560438 C | 11/2009 |
| JP | 5263899 B2 | 8/2013 |
| WO | 9834982 A1 | 8/1998 |
| WO | 2001053077 A1 | 7/2001 |
| WO | 20090098463 A1 | 8/2009 |
| WO | 2010093366 A1 | 8/2010 |
| WO | 2012093036 A1 | 7/2012 |
| WO | 2013004646 A1 | 1/2013 |

OTHER PUBLICATIONS

International Search Report and Written Opinion dated Mar. 6, 2014 relating to International Patent Application No. PCT/US2013/068224.

* cited by examiner

*Primary Examiner* — Sheeba Ahmed
(74) *Attorney, Agent, or Firm* — Dinsmore & Shohl LLP

(57) ABSTRACT

A primer coating is provided for use on polymeric substrates to enhance the adhesion of metallized coatings to the substrates. The primer coating also improves the gas barrier properties of the substrate when used in combination with a metallized coating. The primer coating includes an amorphous polyvinyl alcohol, polyethyleneimine, and optionally, an aqueous dispersion of polyurethane. The primer coating may be applied to a variety of polymeric substrates including polylactic acid, polyethylene terephthalate, biaxially oriented polyethylene terephthalate, oriented polypropylene, biaxially oriented polypropylene, and biaxially oriented polyamide. When used in combination with the subsequently applied metallized coating, an oxygen transmission rate of about 0.1 and 5.0 cc/m2/day at 0% relative humidity is achieved.

20 Claims, No Drawings

PRIMER COATING FOR METALLIZED GAS BARRIER FILMS

CROSS REFERENCE TO RELATED APPLICATIONS

This application is a continuation of U.S. application Ser. No. 14/070,115, entitled PRIMER COATING FOR METALLIZED GAS BARRIER FILMS filed Nov. 1, 2013, which claims the benefit of U.S. Provisional Application Ser. No. 61/721,834, entitled PRIMER COATING FOR METALLIZED GAS BARRIER FILMS filed Nov. 2, 2012, the entire contents of which are hereby incorporated by reference.

BACKGROUND OF THE INVENTION

Embodiments of the invention relate to a primer coating for use on polymeric substrates, and more particularly, to a primer coating including an amorphous polyvinyl alcohol and polyethyleneimine which can be applied to substrates which are subsequently supplied with a metallized coating to provide a polymeric substrate having improved gas barrier properties.

Thermoplastic polymer films such as polyamide and polyester films have excellent strength, transparency, and are widely used as packaging materials for food, cosmetics, medicine, and the like. However, such films are relatively permeable to gases such as oxygen. During storage, gases can permeate the film and interact with the package contents, causing degradation thereof.

Gas barrier coatings or primers are known in the art for use on polymeric substrates used in packaging to provide a barrier to prevent degradation of the product. One known gas barrier coating is crystalline polyvinyl alcohol, which exhibits excellent gas barrier properties under low humidity conditions. However, as the humidity increases, the gas barrier properties of the coating decline rapidly.

Another known gas barrier coating is a metallized coating. Such a coating typically comprises a thin layer of aluminum which is applied to a substrate by vacuum deposition. Such a metallized coating reduces the permeability of the polymeric film substrate to light, water and oxygen. However, it would be desirable to improve the adhesion of metallized coatings to the substrate and to improve the gas barrier properties of such coatings.

Accordingly, there is a need in the art for a primer coating for use on polymeric substrates which is receptive to subsequently applied metallized coatings and which enhances the barrier properties of the substrate to which it is applied.

SUMMARY OF THE INVENTION

Embodiments of the invention meet those needs by providing a primer coating which can be applied to polymeric substrates to provide enhanced adhesion of a metallized coating to the substrate and which provides enhanced barrier properties to the substrate over the use of a metallized coating alone.

According to one aspect of the invention, a primer coating is provided for enhancing the adhesion of a metallized coating to a polymeric substrate. The primer coating comprises an amorphous polyvinyl alcohol, a polyethyleneimine, and optionally, an aqueous dispersion of polyurethane. Upon application of a metallized coating over the primer coating, the primer coating provides enhanced adhesion as well as improved gas barrier properties to the substrate over the use of the metallized coating alone.

In one embodiment, the primer coating comprises from about 5 to 15% by weight amorphous polyvinyl alcohol, from about 0.01 to about 0.15% by weight polyethyleneimine, and the balance water.

In another embodiment, the primer coating comprises from about 5 to 15% by weight amorphous polyvinyl alcohol, from about 0.01 to about 0.15% by weight polyethyleneimine, from about 0.1 to about 5% by weight of an aqueous dispersion of polyurethane having a solids content of about 33% by weight; and the balance water.

The primer coating may further comprise a wetting agent such as a surfactant. The coating may also include additives such as preservatives and defoaming agents.

The primer coating is preferably applied in liquid form to a polymeric substrate by applying the coating to at least one major surface of the substrate, followed by drying. In one embodiment, the method of applying the primer coating includes treating at least one major surface of the substrate with a corona discharge treatment prior to applying the coating.

The primer coating may be applied to a number of different polymeric substrates including polymers selected from the group consisting of polylactic acid (PLA), polyethylene terepthalate (PET), biaxially oriented polyethylene terepthalate (BOPET), oriented polypropylene (OPP), biaxially oriented polypropylene (BOPP), and biaxially oriented polyamide.

The primer coating may be applied by gravure coating, rod coating, or flexographic printing, and is preferably applied at a coat weight (dry weight basis) of about 0.05 to about 2.0 g/m$^2$ (about 0.06 to 2.27 µm in thickness).

The primer coating may be applied either inline or offline, followed by subsequent metallization. Prior to the application of the metallized coating, the polymeric substrate including the primer coating may be stretched. For example, in one embodiment of an inline process, the coating is applied during manufacture of the polymeric (film) substrate and is applied in liquid form after the longitudinal stretch of the film but prior to the transverse stretch. In one embodiment of an offline process, the primer composition is applied after manufacture and biaxial stretching of the film in a separate step, followed by metallization.

Upon drying, a metallized coating may be applied on the primer coating by vacuum deposition. Such a metallized coating may comprise aluminum or any other metal or metal oxide coating which provides suitable barrier properties. The primer coating, when applied to a substrate followed by the application of a metallized coating, provides an oxygen transmission rate (OTR) of between about 0.1 and 5.0 cc/m$^2$/day at 0% relative humidity.

Accordingly, it is a feature of embodiments of the invention to provide a primer coating for use on a polymeric substrate which is subsequently provided with a metallized coating, where the primer coating provides both good adhesion of the metallized coating as well as improved gas barrier properties for the substrate. Other features and advantages of the invention will be apparent from the following description and the appended claims.

DETAILED DESCRIPTION

Embodiments of the primer coating described herein provide advantages over the use of metallized coatings alone on polymeric substrates in that they provide good adhesion of the metallized coating as well as enhancing the gas barrier properties of the polymeric substrate when used in combination with the subsequently applied metallized coating.

Unless otherwise indicated, the disclosure of any ranges in the specification and claims are to be understood as including the range itself and also values subsumed therein, as well as endpoints.

One primer coating comprises about 10.5% by weight of an amorphous polyvinyl alcohol, about 0.10% polyethyleneimine, and the balance deionized water. It should be appreciated that the primer coating may also include additives such as preservatives (about 0.02% to 0.20% by weight), defoaming agents (about 0.1% to 0.05% by weight), and wetting agents (about 0.20% to 1% by weight).

Another primer coating comprises about 10.5% by weight of an amorphous polyvinyl alcohol, about 0.10% polyethyleneimine, about 0.1% to 5% of an aqueous dispersion of polyurethane having a solids content of about 33% by weight, and the balance water. Alternatively, the primer coating may comprise from about 0.03 to 2.5% by weight polyurethane, preferably in the form of an aqueous dispersion having a solids content of about 33 to about 50% by weight.

A suitable amorphous polyvinyl alcohol for use in the primer coating is commercially available from Nippon Gohsei under the designation G-Polymer™ OKS-8049 or AZF-8035W. OKS-8049 has a melting point of 185° C. and a viscosity of 4.5 mPa·s at 4% aqueous solution at 20° C., and AZF8035W has a melting point of 171° C. and a viscosity of 3.0 mPa·s at 4% aqueous solution at 20° C.

The polyethyleneimine acts as an adhesion promoter to achieve good adhesion of the coating to a polymeric substrate. A suitable polyethyleneimine is Lupasol® P from BASF. Another suitable polyethyleneimine is Polymin® P, available from BASF.

Suitable polyurethane dispersions include NeoRez® R-600 and NeoRez® R-605, both available from DSM NeoResins.

The primer coating is preferably prepared by adding the components to a mixing vessel and mixing at ambient temperatures until all of the components are adequately blended.

The primer coating may be applied by gravure coating, rod coating, or flexographic printing at ambient temperature to polymeric substrates. Prior to applying the primer coating, it is preferable to use a corona discharge pre-treatment on the substrate to ensure that the coating will wet out the surface of the film and achieve adequate coverage. This treatment may be applied either in-line or off-line.

Suitable polymeric substrates include polylactic acid (PLA), polyethylene terepthalate (PET), biaxially oriented polyethylene terepthalate (BOPET), oriented polypropylene (OPP), biaxially oriented polypropylene (BOPP), and biaxially oriented polyamide (BOPA). Typically, for food packaging applications, the polymer films will range in thickness from about 10 to about 100 μm.

The primer coating may be applied to one or both sides of the substrate as desired. After the primer coating has dried, the primer coated substrate is then preferably stretched (oriented) prior to deposition of the metallized coating to improve the gas barrier properties. The stretching is preferably accomplished by heating the film to a molten state followed by stretching in the machine direction, followed by stretching in the transverse direction (90 degrees from machine direction), followed by quenching.

The primer coated polymeric substrates are then vacuum deposited with a metallized coating such as aluminum. The optical density of the vacuum-deposited aluminum is preferably about 2.0.

In order that the invention may be more readily understood, reference is made to the following examples which are intended to illustrate the invention, but not limit the scope thereof.

Example 1

Primer coatings were prepared in accordance with an embodiment of the invention using the following components: amorphous polyvinyl alcohol (G-Polymer™) polyethyleneimine, and deionized water.

See formulations 1 and 2 below.

Formulation 1

| Component | Wt. % of total composition |
| --- | --- |
| deionized water | 89.3 |
| amorphous PVOH[1] | 10.5 |
| 50% polyethyleneimine[2] | 0.1 |
| preservative[3] | 0.1 |

[1]G-polymer ™ AZF8035W from Soarus LLC (supplied as a solid powder)
[2]Lupasol ® P from BASF (supplied as a 50% aqueous solution)
[3]Proxel ™ GXL from Arch Chemicals (supplied as an 18-20% active solution Formulation 2

| Component | Wt. % of total composition |
| --- | --- |
| deionized water | 89.3 |
| amorphous PVOH[1] | 10.5 |
| 50% polyethyleneimine[2] | 0.1 |
| preservative[3] | 0.1 |

[1]G-polymer ™ OKS-8049 from Soarus LLC
[2]Lupasol ® P from BASF
[3]Proxel ™ GXL from Arch Chemicals The following comparative formulations were also prepared:

Comparative Formulation 3

| Component | Wt. % of total composition |
| --- | --- |
| deionized water | 89.5 |
| 50% polyethyleneimine[1] | 8.9 |
| Formaldehyde crosslinker | 1.5 |
| preservative[2] | 0.1 |

[1]Lupasol ® P from BASF
[2]Proxel ™ GXL from Arch Chemicals

Comparative Formulation 4

| Component | Wt. % of total composition |
|---|---|
| deionized water | 91.35 |
| PVOH[1] | 8.5 |
| Preservative[2] | 0.15 |

[1]Elvanol ® 90-50 from DuPont (semi-crystalline PVOH)
[2]Proxel™ GXL from Arch Chemicals Additional primer coatings were prepared in accordance with another embodiment of the invention using the following components: amorphous polyvinyl alcohol (G-Polymer™), polyethyleneimine, a polyurethane dispersion, and deionized water. See formulations 5-7 below.

Formulation 5

| Component | Wt. % of total composition |
|---|---|
| deionized water | 89.00 |
| amorphous PVOH[1] | 10.5 |
| Polyurethane dispersion[2] | 0.400 |
| Polyethyleneimine[3] | 0.100 |

[1]G-polymer™ OKS-8049 from Soarus LLC
[2]NeoRez ® R-600 from DSM NeoResins (33% solids)
[3]Polymin ® P from BASF (50% solids)

Formulation 6

| Component | Wt. % of total composition |
|---|---|
| deionized water | 88.60 |
| amorphous PVOH[1] | 10.5 |
| Polyurethane dispersion[2] | 0.800 |
| Polyethyleneimine[3] | 0.100 |

[1]G-polymer™ OKS-8049 from Soarus LLC
[2]NeoRez ® R-600 from DSM NeoResins
[3]Polymin ® P from BASF Formulation 7

| Component | Wt. % of total composition |
|---|---|
| deionized water | 87.60 |
| amorphous PVOH[1] | 10.3 |
| Polyurethane dispersion[2] | 2.0 |
| Polyethyleneimine[3] | 0.100 |

[1]G-polymer™ OKS-8049 from Soarus LLC
[2]NeoRez ® R-600 from DSM NeoResins
[3]Polymin ® P from BASF A comparative formulation was also prepared:

Comparative Formulation 8

| Component | Wt. % of total composition |
|---|---|
| deionized water | 83.10 |
| amorphous PVOH[1] | 9.8 |
| Polyurethane dispersion[2] | 7.0 |
| Polyethyleneimine[3] | 0.100 |

[1]G-polymer™ OKS-8049 from Soarus LLC
[2]NeoRez ® R-600 from DSM NeoResins
[3]Polymin ® P from BASF All formulations were prepared by adding the components to a mixing vessel at ambient temperature until all components were blended. The liquid formulas were then applied at room temperature onto various polymeric substrate samples using a 2 BCM gravure cylinder. For samples 7-9, formulation 3 was coated on the film samples, dried at 190° F. in a hot air oven, rewound, and then coated with formulation 4.

The polymeric substrates were corona discharge treated prior to primer coating. The primer coated samples were then tested for oxygen transmission. The results are shown in Table 1 below.

TABLE 1

| Sample | Film | Coating Formulation | Coat weight (dry gsm) | OTR (cc/m²/day) |
|---|---|---|---|---|
| 1 | BOPET | 1 | 0.21 | 3.76 |
| 2 | BOPP | 1 | 0.21 | 6.56 |
| 3 | PLA | 1 | 0.27 | 7.97 |
| 4 | BOPET | 2 | 0.23 | 0.53 |
| 5 | BOPP | 2 | 0.23 | 7.07 |
| 6 | PLA | 2 | 0.31 | 5.65 |
| 7 | BOPET | 3 and 4 | 0.1 | 40.15 |
| 8 | BOPP | 3 and 4 | 0.1 | 61.76 |
| 9 | PLA | 3 and 4 | 0.1 | 22.43 |
| 10 | BOPET | 5 | 0.3 | 3.0 |
| 11 | BOPET | 6 | 0.3 | 2.7 |
| 12 | BOPET | 7 | 0.3 | 0.60 |
| 13 | BOPET | 8 | 0.3 | 35.70 |

As can be seen, samples which were coated with formulations 1-2 and 5-7 exhibited lower oxygen transmission rates than comparative formulations 3-4, which did not include a combination of an amorphous polyvinyl alcohol and polyethyleneimine, and formulation 8, which included 7 wt % of the polyurethane dispersion.

Example 2

Various polymeric substrates were coated with primer formulation 1 as described in Example 1 and with comparative primer formulations 9 and 10 below:

Comparative Formulation 9

| Component | Wt. % of total composition |
|---|---|
| Polyurethane dispersion[1] | 99.97 |
| Defoamer | 0.03 |

[1]NeoRez ® R-600 from DSM NeoResins

Comparative Formulation 10

| Component | Wt. % of total composition |
|---|---|
| Ethylene acrylic acid dispersion[1] | 46.7 |
| Polyurethane dispersion[2] | 16.6 |
| Ethylene acrylic acid dispersion[3] | 36.7 |

[1]Michem ® Prime 4990R from Michelman
[2]NeoRez ® R-600 from DSM NeoResins
[3]Primacor ® 5990 from Dow (dispersed in sodium hydroxide) at 20% solids Selected primer coated samples were metallized by placing the samples on a web in an industrial vacuum chamber for deposition with aluminum. The oxygen transmission (OTR) measurements of primer coated films with and without metallized coatings is shown below in Table 2.

TABLE 2

| Sample | Film | Coating Formulation | Coat weight (dry gsm) | Metallized coating | OTR (cc/m²/24 hrs) 1st measurement | OTR (cc/m²/24 hrs) 2nd measurement |
|---|---|---|---|---|---|---|
| | No stretching | | | | | |
| 1 | PET | 1 | 0.5 | No | 1.516 | 1.03 |
| 2 | PLA | 1 | 0.5 | No | 0.258 | 0.167 |
| 3 | OPP | 1 | 0.5 | No | 0.36 | 0.4 |
| 4 | PET | 1 | 0.5 | Yes | 0.03 | 0.079 |
| 5 | PLA | 1 | 0.5 | Yes | 0.7 | 1.045 |
| 6 | OPP | 1 | 0.5 | Yes | 0.34 | 0.32 |
| | After stretching | | | | | |
| 7 | PET | No coating | | Yes | 2.7 | 2.37 |
| 8 | PET | 1 | 0.04 | Yes | 0.36 | 0.22 |
| 9 | PET | 1 | 0.1 | Yes | 0.91 | 0.36 |
| 10 | PET | 6 | 0.1 | Yes | 9.73 | 9.01 |
| 11 | PET | 6 | 0.25 | Yes | 21.38 | 16.21 |
| 12 | PET | 9 | 0.1 | Yes | 8.5 | 7.56 |
| 13 | PET | 10 | 0.3 | Yes | 9.75 | 9.28 |

As can be seen, the samples which included both a primer coating formulation of the present invention and a metallized coating had lower oxygen transmission rates than the samples which did not include the primer coating and/or the metallized coating. It can also be seen that samples which contained the comparative primer formulations had higher oxygen transmission rates in comparison with the primer formulations of the present invention.

Having described the invention in detail and by reference to preferred embodiments thereof, it will be apparent that modifications and variations are possible without departing from the scope of the invention.

What is claimed is:

1. A primer coating comprising a blend of an amorphous polyvinyl alcohol and a polyethyleneimine.

2. The primer coating of claim 1, wherein the primer coating comprises from about 5% to about 15% by weight amorphous polyvinyl alcohol.

3. The primer coating of claim 1, wherein the primer coating comprises from about 0.1% by weight to about 0.15% by weight polyethyleneimine.

4. The primer coating of claim 1, further comprising a wetting agent, a defoaming agent, or a preservative.

5. A coated polymeric substrate having first and second major surfaces, with at least one of the first and second major surfaces having the primer coating of claim 1 coated thereon.

6. The coated polymeric substrate of claim 5, wherein the coated polymeric substrate exhibits an oxygen transmission rate of less than about 8 cc/m²/day.

7. A method of applying a primer coating to a polymeric substrate comprising:
   providing a polymeric substrate having first and second major surfaces; and
   applying a primer coating to at least one of the first and second major surfaces of said substrate, the primer coating comprising a blend of an amorphous polyvinyl alcohol and a polyethyleneimine.

8. The method of claim 7, further comprising:
   depositing a metallized coating on the at least one of the first and second major surfaces.

9. The method of claim 8, wherein the metallized coating is deposited over the primer coating.

10. The method of claim 8, wherein the metallized coating comprises aluminum.

11. The method of claim 8, wherein the primer coating and metallized coating, in combination, exhibit an oxygen transmission rate of about 0.1 and 5.0 cc/m²/day at 0% relative humidity.

12. The method of claim 7, further comprising:
   treating the at least one of the first and second major surfaces with a corona discharge treatment prior to applying the primer coating.

13. The method of claim 7, wherein the primer coating comprises from about 5% to about 15% by weight amorphous polyvinyl alcohol.

14. The method of claim 7, wherein the primer coating comprises from about 0.1% by weight to about 0.15% by weight polyethyleneimine.

15. A coated polymeric substrate comprising:
   a polymeric substrate having first and second major surfaces; and
   a primer coating disposed on at least one of the first and second major surfaces, the primer coating comprising an amorphous polyvinyl alcohol and a polyethyleneimine.

16. The coated polymeric substrate of claim 15, further comprising:
   a metallized coating.

17. The coated polymeric substrate of claim 16, wherein the metallized coating is disposed over the primer coating.

18. The coated polymeric substrate of claim 16, wherein the metallized coating comprises aluminum.

19. The coated polymeric substrate of claim 16, wherein the coated polymeric substrate exhibits an oxygen transmission rate of about 0.1 and 5.0 cc/m²/day at 0% relative humidity.

20. The coated polymeric substrate of claim 15, wherein the primer coating comprises from about 5% by weight to about 15% by weight amorphous polyvinyl alcohol and from about 0.1% by weight to about 0.15% by weight polyethyleneimine.

* * * * *